Patented July 17, 1951

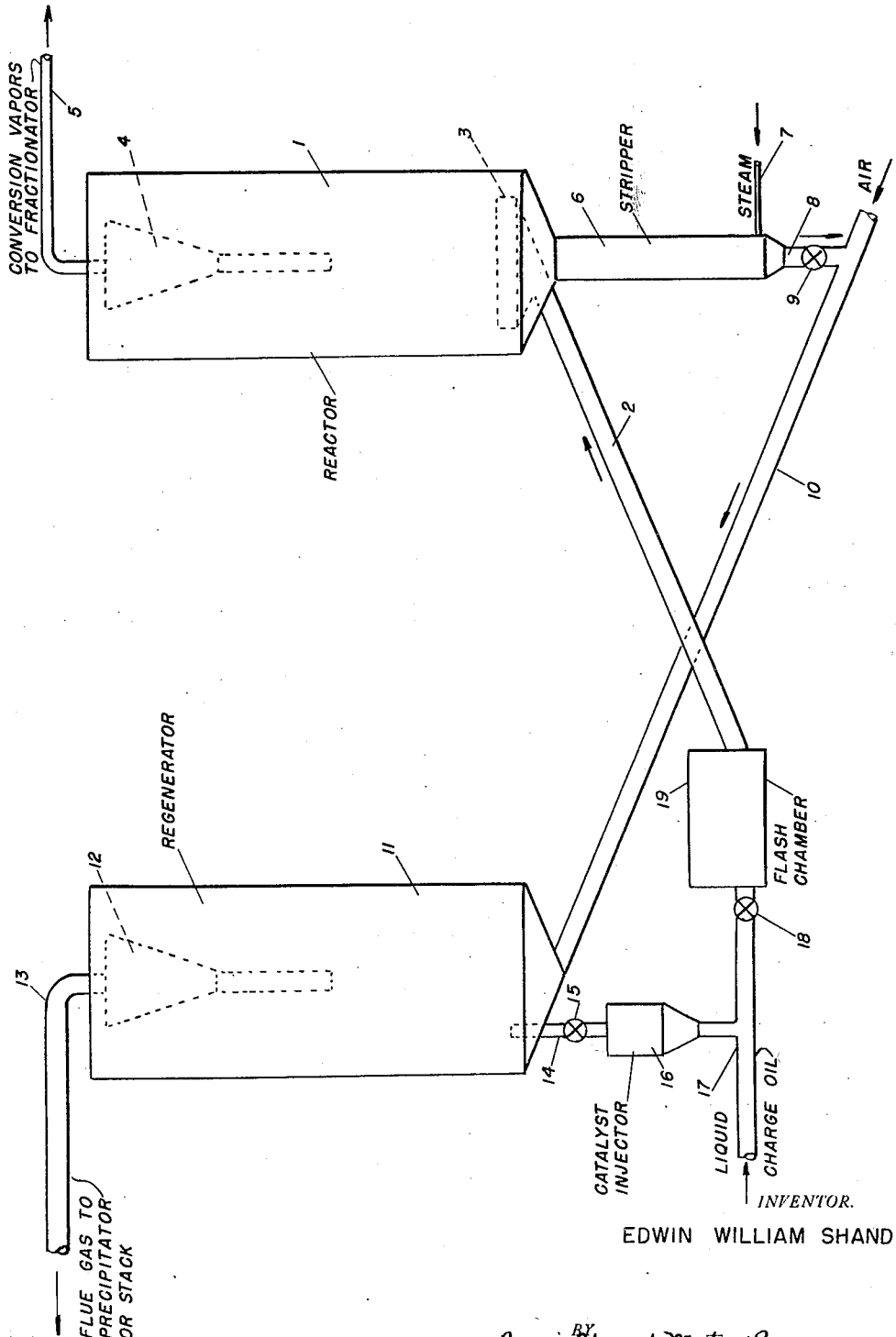

2,560,899

UNITED STATES PATENT OFFICE 2,560,899

PROCESS AND APPARATUS FOR THE CATALYTIC CONVERSION OF HYDROCARBONS

Edwin William Shand, Homewood, Ill., assignor to Sinclair Refining Company, New York, N. Y., a corporation of Maine Application April 30, 1947, Serial No. 745,049

4 Claims. (Cl. 196—52)

This invention relates to the pyrolytic conversion of hydrocarbons and, more particularly, to pyrolytic conversion processes involving the use of a finely divided catalyst.

The invention is especially applicable to conversion processes of the general type wherein a finely divided catalyst, at elevated temperature, in suspension in vaporized charge oil, is passed to a reactor in which conversion of the oil occurs and in which the spent catalyst is separated from the oil vapors, the separated catalyst stripped of oil, regenerated, and the regenerated catalyst returned to the reactor in suspension in vaporized charge oil. Operations of the type described are commonly designated fluid catalyst processes.

One of the problems confronting the industry in the practical operation of such processes has been the difficulty of effecting thorough and uniform contact between the catalyst and the hydrocarbon vapors in the reactor. Where the extent of contact with the catalyst of uniform activity is not uniform, a lack of uniformity of conversion products is apt to result.

I have found that uniformity of contact between the catalyst and oil vapors in the reaction zone is promoted by thorough and uniform dispersion of the catalyst in the hydrocarbon vapors, prior to introduction into the reactor.

In conventional practice, the hot catalyst is passed from the regenerator into a current of hot hydrocarbon vapors to be converted, and is carried along by the vapor stream directly to the reactor.

In accordance with my present invention, more thorough and uniform dispersion of the catalyst in the vapor stream passing to the reactor, with a resultant more uniform contacting of the catalyst and hydrocarbon vapors in the reaction zone, is effected by admixing the catalyst to be introduced into the reaction zone, that is, either fresh or regenerated catalyst, with the hydrocarbon charge oil in liquid phase and under super-atmospheric pressure. The resultant suspension of catalyst in the charge oil is then introduced into a zone of lower pressure in which the liquid hydrocarbon is flashed into vapors resulting in an exceptionally thorough dispersion of the catalyst in the vapors. The catalyst suspended in the vapors is then passed to the reaction zone in the customary manner.

By reason of the sudden flashing of the liquid hydrocarbons into vapor, there appears to be a breaking up of agglomerates of the ultimate particles of catalysts by a sort of explosive action. But, whatever the explanation, a more thorough dispersion of the catalyst in the oil vapors is obtained than is obtained in conventional practice, according to which the catalyst is merely introduced into a flowing stream of oil vapors passing to the reactor.

Catalysts dispersed and suspended in the vapors, in accordance with my present invention, exhibit a lesser tendency to drop out of suspension and, accordingly, a more uniform contacting and conversion in the reaction zone is attained.

The present invention provides an improvement process adapted to continuous operation and comprising a plurality of cooperating steps so coordinated as to constitute a uniform operation in which a charge of catalyst is repeatedly used and intermittently regenerated and returned to the cracking zone, in exceptionally uniform and thorough dispersion in the oil vapors. The invention further provides an improved apparatus particularly adapted to the carrying out of the process.

Other advantages derived from my invention will appear from the following detailed description of its application to a fluid catalytic cracking operation with reference to the accompanying drawing, which represents, conventionally and diagrammatically, a flow diagram of such operation embodying my invention.

Referring, more particularly, to that embodiment of my invention shown in the accompanying drawing, the apparatus, indicated by the reference numeral 1, represents a generally cylindrical reactor of conventional type. The finely divided catalyst, suspended in vaporized charge oil, enters the reactor through conduit 2, extending into the reactor, and terminating in a conical member 3 of somewhat smaller diameter than the reactor and opening into the reactor through a conventional grid. As the hot vapors pass upwardly in the reactor, there is a tendency for the catalyst to drop out of suspension forming a so-called "high density" or "dense phase" fluidized body of catalyst in the reactor which flows downwardly through the annular space between the member 3 and the walls of the reactor.

Oil vapors, product of the conversion, rise to the top of the reactor, pass through a cyclone type separator 4, to remove suspended catalyst from the vapors, the latter passing therefrom through conduit 5 to fractionating apparatus, not shown, the separated catalyst dropping back into the dense phase body of catalyst in the reactor.

Spent catalyst, flows from the bottom of the reactor into the stripping column 6, and passes downwardly therethrough countercurrent to steam injected into the lower part of the stripping column through line 7. The stripped spent catalyst flows from the bottom of the stripper through conduit 8, in which there is interposed a valve arrangement 9 for controlling a flow of the catalyst, advantageously a conventional type slide valve. From thence, the spent catalyst flows into conduit 10 where it is picked up by a current of air and carried into the bottom of the regenerator 11, of conventional type.

Upon contact of the air with the hot catalyst, the coke or carbon deposited on the catalyst is burned off in the manner with which the art is familiar. The products of combustion pass from the top of the regenerator, through cyclone type separator 12, for the removal of suspended catalyst, and the flue gases pass off through conduit 13 to a precipitator or stack, not shown in the drawing.

Regenerated catalyst flows from the regenerator through regenerated catalyst leg 14, the flow being controlled by valve 15, into a conventional type catalyst injector 16.

The regenerated catalyst is forced by the injector 16 into conduit 17 in which it is picked up by a stream of preheated charge oil in liquid phase and under super-atmospheric pressure. This preheated charge oil is advantageously heated to a temperature only slightly below that at which it is substantially completely vaporized under the existing pressure. Additional heat is supplied to the oil by contact with the hot catalyst.

In passing through conduit 17, the pressure is released on the oil-catalyst mixture at pressure release valve 18 and, by reason of the pressure reduction and additional heat supplied by the hot catalyst, the oil is flashed into vapors in the flash chamber diagrammatically indicated at 19. From the flash chamber, the oil vapors, with the catalyst intimately dispersed therein, pass through conduit 2 to the reactor.

The catalyst employed may be of the type conventionally used in fluid catalyst processes, for instance, a silica-alumina type catalyst in finely divided or powdered form. The reaction conditions may, likewise, be those conventionally used in operations of this type and, as understood by the art, the optimum temperatures and pressures will depend primarily upon the type of stock used, the particular catalyst employed, and the reaction desired. In cracking gas oil, for instance, the reaction temperature may, with advantage, be within the range of about 800° to 1,000° F., and the pressure at the top of the reactor within the range of about 5 to 25 pounds per square inch. The regeneration temperature will usually be within the range of 950° to 1,200° F.

Where gas oil is used as the charge oil, it is advantageously preheated to a temperature within the range of about 600° to 900° F. under a super-atmospheric pressure of, say, 50 to 400 pounds per square inch and, in the flash chamber, this pressure may be reduced to that merely sufficient to force the resultant vapor-catalyst suspension through the system at the desired operating pressure. When using a lighter charge oil, it may be preheated to a somewhat lower temperature.

It will be understood that the present invention is not restricted to the particular embodiment thereof herein described, but is applicable to various modifications of fluid catalyst processes.

I claim:

1. In the fluid catalyst process for the conversion of hydrocarbons wherein a hydrocarbon charge oil is passed upwardly in vapor phase through a dense phase fluidized body of catalyst with a superimposed dispersed phase in a reaction zone from which catalyst is continuously withdrawn, the withdrawn catalyst regenerated and returned to the reaction zone in suspension in charge oil vapors, the steps of mixing the regenerated catalyst with the hydrocarbon charge oil in liquid state and under superatmospheric pressure, suddenly reducing the pressure on the mixture whereby the hydrocarbon oil is flashed into vapors and passing the resultant vapors with the catalyst suspended therein to the reaction zone.

2. In the fluid catalyst process for the conversion of hydrocarbons wherein a hydrocarbon charge oil is passed upwardly in vapor phase through a dense phase fluidized body of catalyst with a superimposed dispersed phase in a reaction zone from which body catalyst is continuously withdrawn and to which catalyst is continuously supplied in suspension in charge oil vapors, the steps of mixing the major portion at least of the catalyst supplied to the reaction zone with hydrocarbon charge oil in liquid state and under superatmospheric pressure, suddenly reducing the pressure on the mixture whereby the hydrocarbon oil is flashed into vapors and passing the resultant vapors with the catalyst suspended therein to the reaction zone.

3. Apparatus adapted to the catalytic conversion of hydrocarbons which comprises an enlarged vertically elongated reaction chamber, an enlarged vertically elongated regenerating chamber, each chamber being adapted to contain a dense phase fluidized body of finely divided conversion catalyst with a superimposed dispersed phase, a stripping chamber, a connection for conveying catalyst from the reaction chamber to the stripping chamber, the latter chamber being adapted to the intimate contacting of the catalyst with a gaseous stripping medium, conduit means for conveying stripped catalyst from the stripping chamber to the regenerating chamber, an enlarged flash chamber, conduit means connecting the flash chamber with the reaction chamber, a conduit leading to said flash chamber adapted to the passage of hot liquid hydrocarbon therethrough under super-atmospheric pressure, catalyst injector means connecting the regenerating chamber with the last said conduit and adapted to the injection of finely divided catalyst into the conduit against super-atmospheric pressure therein and a pressure reducing valve in the conduit between the points of catalyst injection and the flash chamber.

4. An apparatus adapted to the catalytic conversion of hydrocarbons which comprises a vertically elongated reaction chamber adapted to contain a dense phase body of fluidized catalyst with a superimposed dispersed phase, conduit means for withdrawing hydrocarbon vapors from the reaction chamber, an enlarged flash chamber, conduit means connecting the flash chamber with the reaction chamber, a conduit leading to the flash chamber adapted to the passage of hot liquid hydrocarbons therethrough under super-atmospheric pressure, catalyst injector means adapted to the injection of finely divided catalyst into the last said conduit against super-atmospheric pressure in the conduit, and a pressure reducing valve in the conduit between the point of catalyst injection and the flash chamber.

EDWIN WILLIAM SHAND.

REFERENCES CITED

The following references are of record in the file of this patent:

UNITED STATES PATENTS

| Number | Name | Date |
| --- | --- | --- |
| 2,237,339 | DeFlorez | Apr. 8, 1941 |
| 2,326,438 | Clarke | Aug. 10, 1943 |
| 2,344,900 | Reeves et al. | Mar. 21, 1944 |
| 2,406,555 | Martin | Aug. 27, 1946 |